Oct. 26, 1954  A. FISCHBACH ET AL  2,692,905
BATTERY DESIGN FOR GUIDED MISSILE APPLICATIONS
Filed Aug. 4, 1952
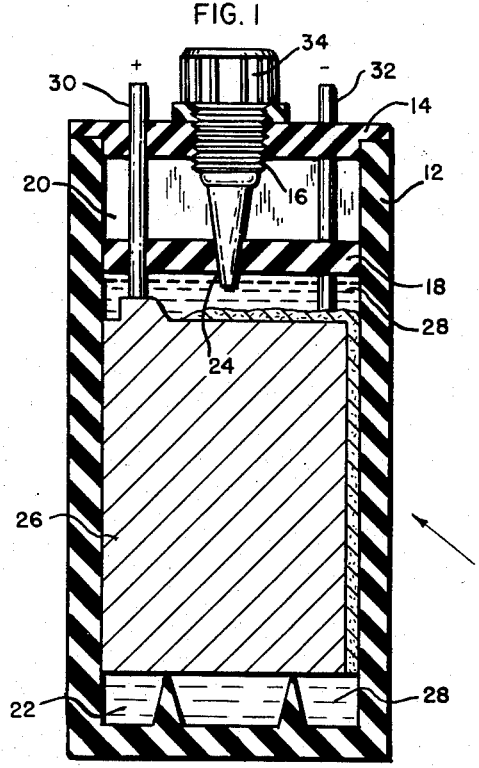
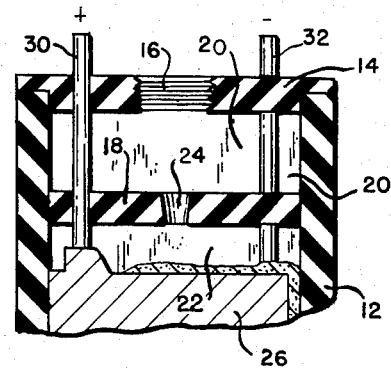
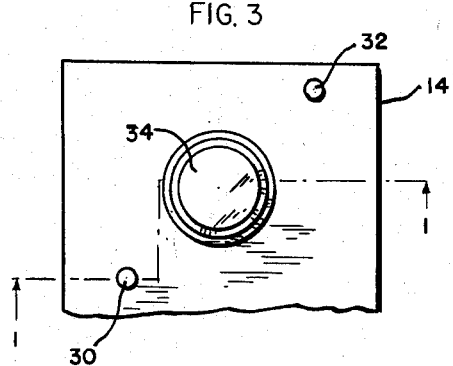
INVENTORS
ADOLPH FISCHBACH
HYMAN J. MANDEL
BY Lawrence Glassman
ATTORNEY

UNITED STATES PATENT OFFICE 2,692,905

BATTERY DESIGN FOR GUIDED MISSILE APPLICATIONS

Adolph Fischbach, Elberon Park, and Hyman J. Mandel, Red Bank, N. J., assignors to the United States of America as represented by the Secretary of the Army Application August 4, 1952, Serial No. 302,636

1 Claim. (Cl. 136—166)

(Granted under Title 35, U. S. Code (1952), sec. 266)

The invention described herein may be manufactured and used by or for the Government for governmental purposes, without the payment of any royalty thereon.

The present invention relates to an improved storage battery case. In certain instances, particularly in guided missiles and in rockets, it is necessary that batteries be used as a source of electrical potential for the operation of certain electrical components contained within said missiles or rockets. Due to the relatively high speeds at which such objects function, it has been found that certain conventional batteries do not function properly in that the high momentum forces cause the electrolyte contained within said batteries to be shifted from their normal location and moved into the upper part of the casing, thereby reducing the effectiveness of the electrolyte and causing a loss in efficiency of the battery proper.

It is therefore an object of the present invention to provide a battery casing provided with upper and lower compartments wherein the lower compartment contains the battery plates and the electrolyte, and further providing means whereby the electrolyte will be effectively contained or confined to said lower compartment wherein the plates of said battery are contained even though the object within which the battery is contained is projected at relatively high speeds.

Another object of the invention is to provide a battery casing wherein the design and arrangement of the parts are such as to increase the effectiveness of the available space wherein the liquid electrolyte, is contained.

Another object of the invention is to provide a battery with a novel type of filler plug.

Other objects and advantages of the invention will be apparent from a detailed description hereinafter set forth and illustrated in the accompanying drawing wherein Fig. 1 is a cross-sectional view of one cell of a preferred design of our invention with the plug in place; Fig. 2 is a fragmentary cross-sectional view with the plug removed, and Fig. 3 is a top plan view of the container and a cell shown in Fig. 1.

Referring particularly to the drawing, the battery is shown generally at 10 and comprises a box-like open top container 12 provided with a cover or lid 14. The cover 14 is provided with a threaded opening 16. Within the container 12 and located proximal to the cover 14 is a transversely positioned diaphragm 18, which serves to partition the container into two separate compartments 20 and 22 which, for convenience, can be designated as the upper and lower compartments respectively. The diaphragm 18 can be secured within the container 12 by any conventional means; one preferred method would be by force fitting it securely to the side walls of the container. The diaphragm 18 is also provided with an opening 24 which is in alignment with the opening 16 of the cover 14. The lower compartment 22 has contained therein the usual conventional battery components such as the plates 26 and the fluid electrolyte 28 and a pair of battery posts 30 and 32 extending from the plates through openings in the diaphragm 18 and through openings in the cover 14 to the outside of the battery. Adapted for insertion into the openings 16 of the cover 14 and opening 24 of the diaphragm 18 is a conically shaped threaded plug 34 provided with a milled cap for ease in handling the plug. The plug 34 is of such length so that when it is securely screwed into the cover 14, the bottom of the plug will extend through the diaphragm 18 and into the lower compartment 22.

In assembling the battery for operation the plug 34 is removed thereby permitting fluid electrolyte to be poured into the lower compartment 22. The plug is then screwed into and through the cover 14 whereby the end of the plug will extend through the diaphragm 18 and into the lower compartment 22. In assembling, care should be taken that all possible sources of leakage be effectively sealed with a sealing compound such as, for example, the side edges of the diaphragm 18. The battery is thus completely assembled and the electrolyte is confined in the lower compartment 22. In operation it has been found that regardless of the speed at which any object or device within which a battery of the type herein set forth has been placed, no electrolyte escapes into the upper compartment 20. While there has been herein described and shown the application of the invention to an individual battery cell, it is obvious that the same general theory and design can be applied to a plurality of individual battery cells or units combined to form one integrated battery.

What is claimed is:

A storage battery comprising an open topped container and a cover plate having an opening therein, said container having a lower compartment adapted to contain battery plates and a fluid electrolyte, and an upper compartment, means dividing said compartments comprising a diaphragm having an opening therein, said battery plates being spaced approximately equally from the bottom of said container and said diaphragm, whereby said plates are completely immersed in said fluid electrolyte when said battery is subjected to a high velocity and said fluid electrolyte is urged in either of two longitudinal directions and a solid plug adapted for insertion thru said openings of said cover plate and said diaphragm.

References Cited in the file of this patent

UNITED STATES PATENTS

| Number | Name | Date |
| --- | --- | --- |
| 746,514 | Hutchison | Dec. 8, 1903 |
| 1,149,988 | Staudt | Aug. 10, 1915 |
| 1,342,952 | Gardiner | June 8, 1920 |
| 2,049,201 | Dunzweiler et al. | July 28, 1936 |